United States Patent [19]

Terada

[11] Patent Number: 5,268,888

[45] Date of Patent: Dec. 7, 1993

[54] FOCUSING SERVO APPARATUS FOR AN OPTICAL DISC

[75] Inventor: Akio Terada, Tokyo, Japan

[73] Assignee: Sony Corporation, Tokyo, Japan

[21] Appl. No.: 865,136

[22] Filed: Apr. 8, 1992

[30] Foreign Application Priority Data

Apr. 9, 1991 [JP] Japan .................................. 3-103978

[51] Int. Cl.⁵ .............................................. G11B 7/09
[52] U.S. Cl. .............................. 369/44.29; 369/44.25; 369/44.35; 250/201.5
[58] Field of Search ............... 369/44.29, 44.25, 44.23, 369/44.34, 44.35, 44.11, 44.28; 250/201.2, 201.5

[56] References Cited

U.S. PATENT DOCUMENTS 5,128,913 7/1992 Fennema et al. ................. 250/201.5

Primary Examiner—Aristotelis Psitos
Assistant Examiner—Muhammad N. Edun
Attorney, Agent, or Firm—Philip M. Shaw, Jr.

[57] ABSTRACT

The present invention is directed to apparatus. Upon actuation, a system controller controls a digital-to-analog converter to derive a pulse-shaped wave sweep signal. This sweep signal is supplied through an adder and a driver to a focusing actuator, and the focusing actuator drives an objective lens of an optical pickup in response to the sweep signal. According to the focusing servo apparatus of the invention, the focusing servo can be locked in smoothly.

6 Claims, 5 Drawing Sheets

FOCUSING SERVO APPARATUS FOR AN OPTICAL DISC

BACKGROUND OF THE INVENTION

1. Field of the Invention

The present invention relates generally to focusing servo apparatus and, more particularly to a focusing servo apparatus for use with an optical disc apparatus or the like.

2. Description of the Prior Art

When an information is recorded on and reproduced from an optical disc, a light (laser beam) must be controlled so as to be properly focused on the optical disc. When the focusing control is actuated, a sweep signal having a sawtooth or triangular waveform shown in FIG. 1, for example, is supplied to a focusing actuator (not shown), whereby an objective lens is moved in the direction close to the optical disc and is also moved in the direction distant from the optical disc after having reached to a predetermined position. In the process during which the objective lens approaches to or goes away from the optical disc as described above, a focusing error signal shown in FIG. 2, for example, is generated. When a focus servo loop is turned on at timing near the timing at which the focusing error signal is just reduced to zero, then the focus servo loop is locked-in, thereby the focusing servo being executed.

When the triangular or sawtooth wave signal is supplied to the focusing actuator as the sweep signal, there is then the problem that the objective lens cannot always be moved smoothly. An apparatus, which is required to have an earthquake-proof property, for example, employs a focusing actuator of a shaft-slide type configuration. In the focusing actuator of shaft-slide type configuration, a shaft is provided in the direction (focusing direction) perpendicular to a record medium and an objective lens is slid along this shaft as a guide. Also, in order to make this focusing actuator as an earthquake-proof type, the objective lens (i.e., objective lens holder) is urged against the shaft so that the objective lens holder cannot be moved in the direction perpendicular to the shaft so easily, thus resulting in a friction force between the objective lens and the shaft being increased.

Accordingly, when the objective lens is moved in response to the sweep signal, then a force larger than a statical friction force is needed when the objective lens starts being moved from the stationary state. However, after the objective lens starts being moved, such friction becomes a dynamical friction, so that the friction force is lowered rapidly. As a consequence, when the objective lens is moved by the triangular wave or sawtooth wave sweep signal, then the objective lens is rapidly moved from the stationary state so that a time T shown in FIG. 2 is reduced considerably (e.g., 500 microseconds). The time T assumes such a duration in which the focusing error signal rises to a positive peak from zero level, then falls through the zero level to a negative peak and returns again to the zero level from the negative peak. When this period T is reduced, even if the focusing servo loop is turned on at the timing at in which the focusing error signal crosses the zero level, then the focusing servo cannot be locked in without difficulty.

In order to remove the above drawbacks, it is proposed to supply a repetitive signal such as a sine wave signal or the like to a tracking actuator when the focusing servo is actuated. If the repetitive signal such as the sine wave signal or the like is supplied to the tracking actuator, then the objective lens is moved by a very small amount in the tracking direction so that a statical friction does not occur, thereby a smooth sweep being realized.

However, if the repetitive signal is supplied to the tracking actuator as described above, the focusing servo and the tracking servo must be effected in association with each other, which makes the servo control complex.

OBJECTS AND SUMMARY OF THE INVENTION

Therefore, it is an object of the present invention to provide a focusing servo apparatus in which the aforesaid shortcomings and disadvantages of the prior art can be eliminated.

More specifically, it is an object of the present invention to provide a focusing servo apparatus of a simplified arrangement in which a focusing servo loop can be locked in smoothly.

As an aspect of the present invention, a focusing servo apparatus is comprised of a focusing actuator for controlling a focusing state, a sweep signal generating circuit for generating a sweep signal which is supplied to the focusing actuator, a loop switch for turning on and off a focusing servo loop, and a controller for turning on and off the loop switch at a predetermined timing, wherein the sweep signal generated from the sweep signal generating circuit is a pulse-shaped wave signal.

The above and other objects, features, and advantages of the present invention will become apparent from the following detailed description of illustrative embodiments thereof to be read in conjunction with the accompanying drawings, in which like reference numerals are used to identify the same or similar parts in the several views.

DESCRIPTION OF THE PREFERRED EMBODIMENTS

The present invention will now be described with reference to the accompanying drawings.

Figure 3:
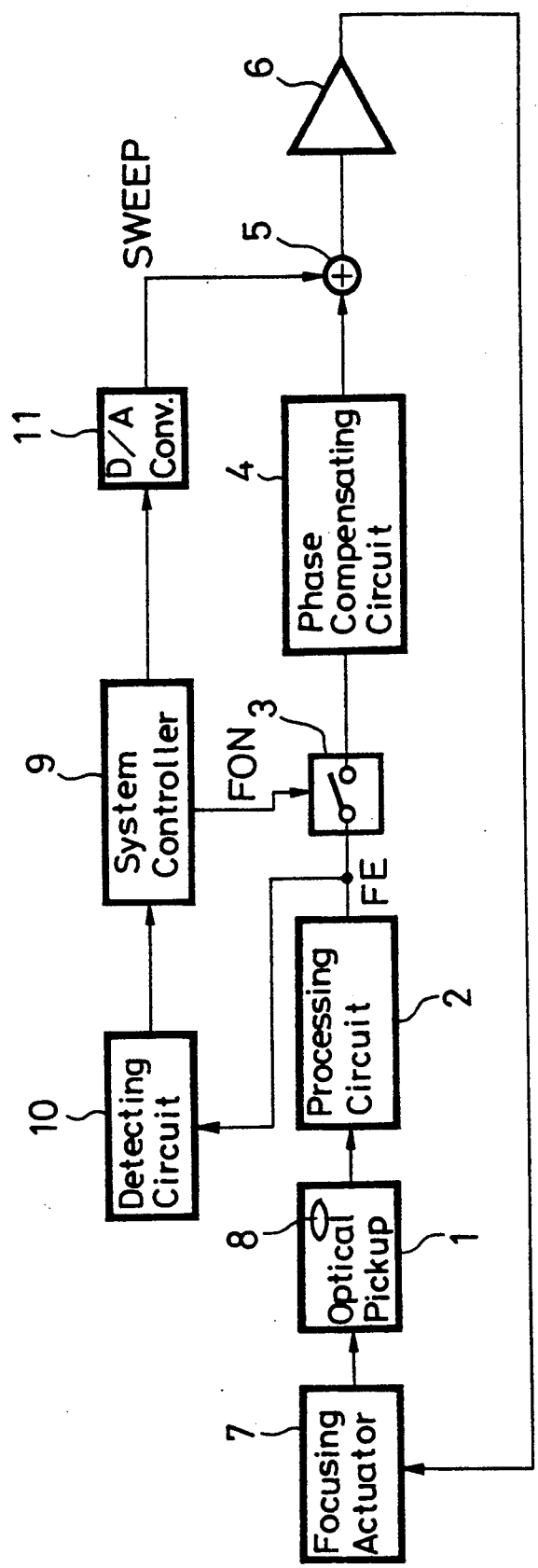
FIG. 3 is a block diagram showing an embodiment of a focusing servo apparatus according to the present invention.

FIG. 3 of the accompanying drawings shows in block a focusing servo apparatus according to a first embodiment of the present invention.

As shown in FIG. 3, an optical pickup 1 houses therein an objective lens 8, a laser diode (not shown) for emitting a laser light or laser beam and a photodiode (not shown) for receiving the laser beam. Accordingly, the optical pickup 1 radiates and focuses a laser beam on a record medium (not shown), receives a reflected laser beam from the record medium and supplies a signal corresponding to the detected level of the reflected laser beam to a processing circuit 2. The processing circuit 2 generates a focusing error signal FE in response to the output signal from the optical pickup 1. This focusing error signal FE may be generated on the basis of a so-called astigmatism method, for example.

The focusing error signal FE is supplied through a loop switch 3 to a phase compensating circuit 4, in which it is phase-conpensated so as to have a predetermined characteristic in order to stabilize a servo system. An output of the phase compensating circuit 4 is supplied through an adder 5 to a driver 6, and the driver 6 drives a focusing actuator 7 in response to the input signal. The focusing actuator 7 drives the objective lens 8 of the optical pickup 1 to control the properly-focused state.

A part of the focusing error signal FE output from the processing circuit 2 is supplied to a detecting circuit 10. The detecting circuit 10 monitors the level of the focusing error signal FE to detect a timing at which the focusing servo loop is turned on. An output of the detecting circuit 10 is supplied to a system controller 9 which might be formed of a microcomputer or the like, for example. The system controller 9 controls the switching operation of the loop switch 3 by its output FON and also supplies predetermined data to a digital-to-analog (D/A) converter 11. A predetermined sweep signal SWEEP is supplied from the D/A converter 11 to the adder 5.

Figure 4:
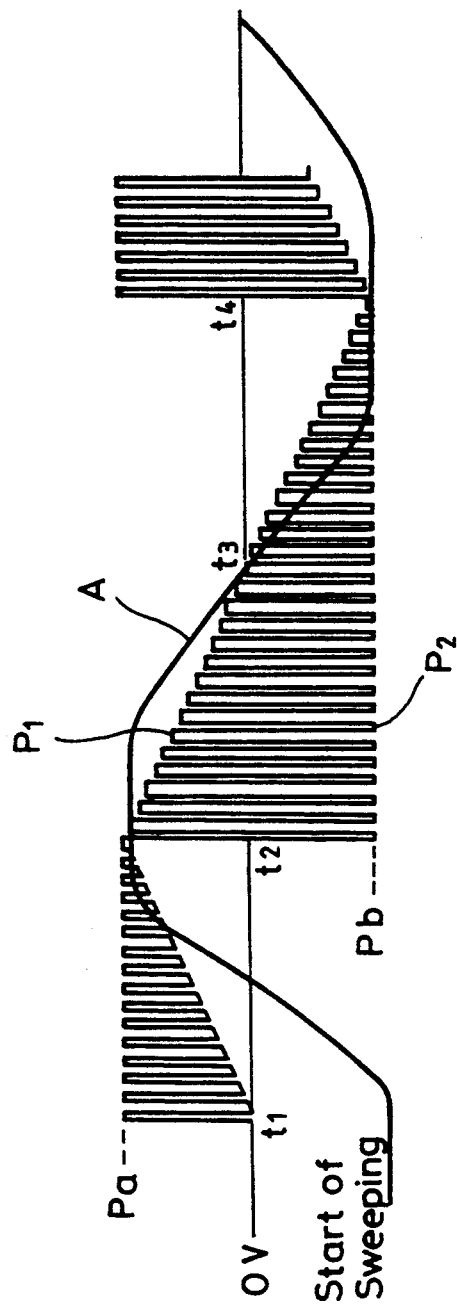
FIG. 4 is a waveform diagram of a sweep signal output from a digital-to-analog converter used in the first embodiment of FIG. 3.

Operation of the focusing servo apparatus according to the first embodiment will be described below with reference to timing charts of FIG. 4.

When supplied with an operation start signal indicative of an operation such as recording, reproduction or the like on a record medium from an input unit (not shown), the system controller 9 supplies predetermined digital data to the D/A converter 11 so that the D/A converter 11 derives the sweep signal SWEEP. Data of the sweep signal SWEEP is adjusted so that the sweep signal SWEEP may have a pulse-shaped waveform as shown in FIG. 4. In the case of the sweep signal shown in FIG. 4, during the period from time $t_1$ to time $t_2$, a positive peak value $P_1$ of each pulse is set constant at a predetermined value Pa, while a negative peak value $P_2$ gradually increases from 0 to the predetermined value Pa. During the period from time $t_2$ to time $t_4$, the negative peak value $P_2$ is set at a constant value Pb, while the positive peak value $P_1$ gradually decreases from Pa to Pb. The sweep signal SWEEP is composed of the repetitive signal of such predetermined cycle.

Figure 5:
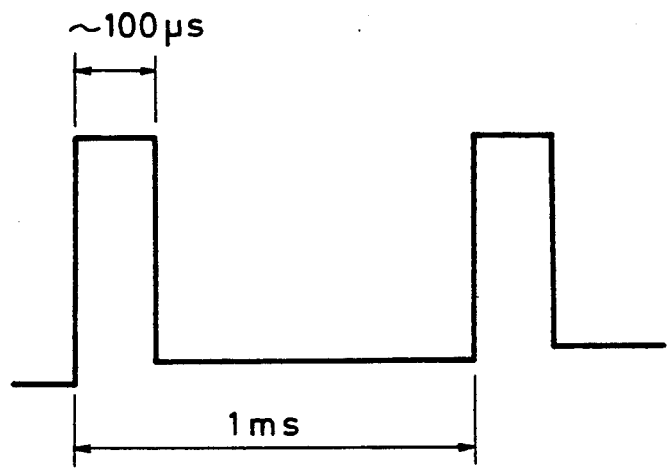
FIG. 5 is a diagram showing the waveform diagram of FIG. 4 in an enlarged scale.

As shown in FIG. 5, a cycle of each pulse is set to 1 millisecond, for example, and the duty ratio 1/10. That is, the pulse width is set to 100 microseconds in this embodiment and the frequency of the sweep signal SWEEP is set in a range of from, for example, 300 Hz to 3 KHz. If the frequency of the sweep signal SWEEP is set to a frequency lower than 300 Hz, then the waveform of the sweep signal SWEEP becomes fundamentally and substantially similar to the sawtooth wave or triangular wave which changes continuously, thus making it impossible to perform the smooth lock-in operation. If on the other hand the frequency of the sweep signal SWEEP is set to a frequency higher than 3 KHz, then the sweep signal SWEEP is influenced by an inductance of the focusing actuator 7, thus making the accurate position control impossible.

The sweep signal SWEEP of pulse-shaped waveform is supplied through the adder 5 to the driver 6. Then, the driver 6 drives the focusing actuator 7 in response to the sweep signal SWEEP supplied thereto so that the focusing actuator 7 nears the objective lens 8 to the record medium (not shown) or moves the objective lens 8 in the direction distant from the record medium. At that time, the position of the objective lens 8 is changed as shown by a curve A in FIG. 4. More specifically, the objective lens 8 is located closest to the record medium in the vicinity of time $t_2$ and is located farthest from the record medium in the vicinity of time $t_4$. The signal processing circuit 2 generates the focusing error signal FE which changes in response to a relative position of the objective lens 8 relative to the record medium.

Figure 6:
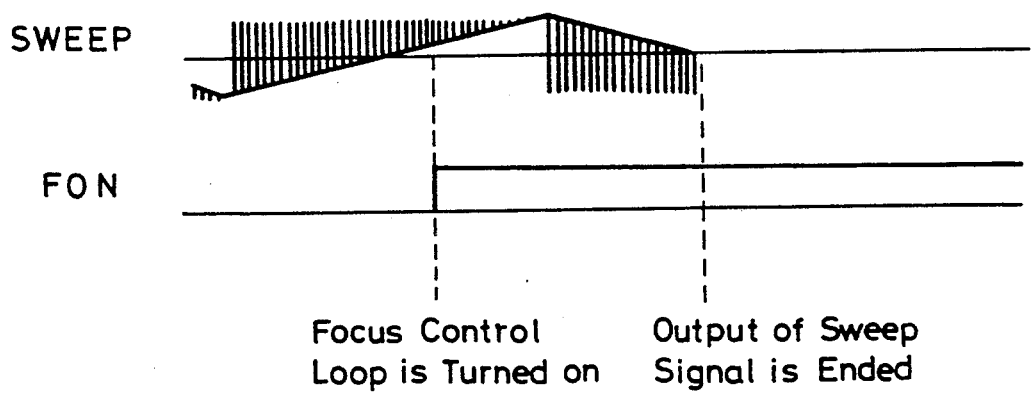
FIG. 6 is a timing chart useful for explaining a timing at which a loop switch is turned on in the first embodiment of FIG. 3.

The detecting circuit 10 monitors the focusing error signal FE output from the processing circuit 2 and outputs the detected signal to the system controller 9 when an absolute value level of the focusing error signal falls within a predetermined reference value. The system controller 9 determines the position of the objective lens 8 on the basis of the detected signal input thereto from the detecting circuit 10 and data output to the D/A converter 11 and turns the loop switch 3 on at a predetermined timing (when the objective lens 8 is located at the position near the properly-focused position) as shown in FIG. 6. Simultaneously, the system controller 9 causes the D/A converter 11 to stop generating the sweep signal SWEEP, whereby the focusing error signal FE output from the processing circuit 2 is supplied through the loop switch 3, the phase compensating circuit 4 and the adder 5 to the driver 6, thereby the focusing actuator 7 being driven in response to the focusing error signal FE. Thus, the focusing servo is locked in.

Figure 1:
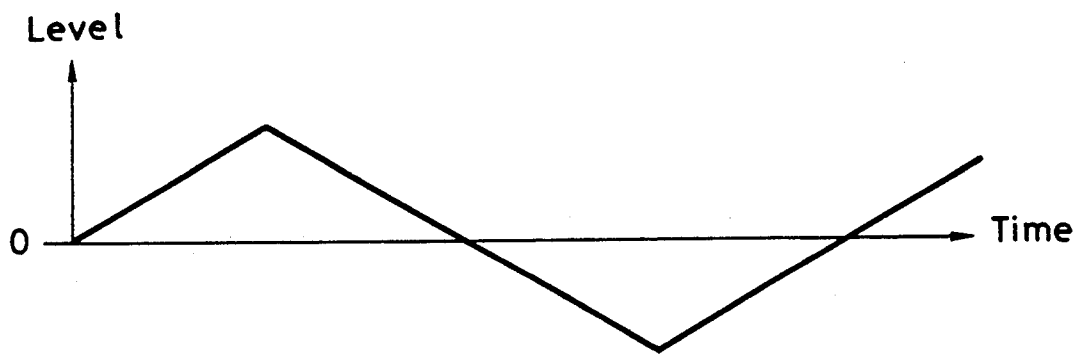
FIG. 1 is a waveform diagram of a sweep signal according to the prior art
Figure 2:
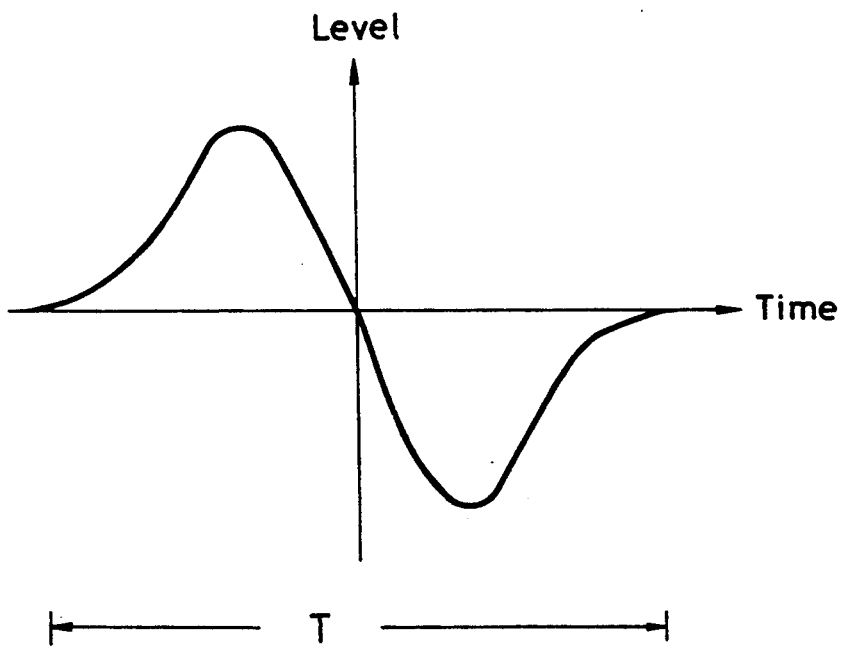
FIG. 2 is a diagram used to explain a focusing error signal.

As set out, by forming the sweep signal as the pulse-shaped wave signal, it is possible to set the period T shown in FIG. 2 to about 2 milliseconds.

Figure 7:
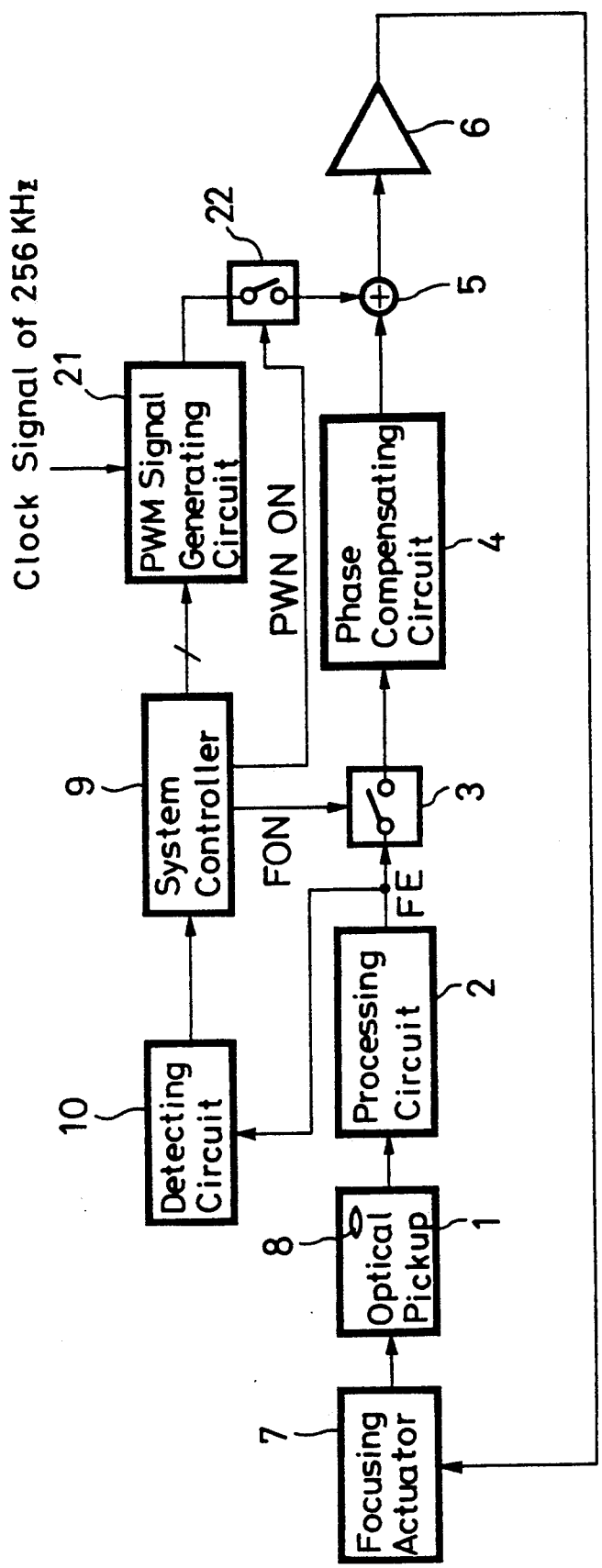
FIG. 7 is a block diagram showing a second embodiment of a focusing servo apparatus according to the present invention.

FIG. 7 is a block diagram showing a focusing servo apparatus according to a second embodiment of the present invention. In FIG. 7, like parts corresponding to those of FIG. 3 are marked with the same references and therefore need not be described in detail.

In the second embodiment of the present invention, the D/A converter 11 used in the first embodiment of FIG. 3 is replaced with a pulse width modulation (PWM) signal generating circuit 21 and a switch 22. A rest of arrangements of FIG. 7 is similar to that of the first embodiment shown in FIG. 3.

The PWM signal generating circuit 21 frequency-divides a clock of 256 KHz, for example, to derive a PWM signal of a predetermined duty. The duty of the PWM signal is controlled in a range of from 0/256 to 256/256 by, for example, 8-bit data input to the PWM signal generating circuit 21 from the system controller 9. The system controller 9 turns on the switch 22 when the sweep signal formed of the PWM signal is supplied to the focusing actuator 7. As a consequence, the PWM signal output from the PWM signal generating circuit 21 is supplied through the adder 5 and the driver 6 to the focusing actuator 7. When the supply of the sweep signal is stopped, then the switch 22 is turned off.

As described above, according to the focusing servo apparatus of the present invention, since the sweep signal is formed as the pulse-shaped wave signal, the focusing servo can be smoothly locked in independently of the tracking servo.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. A focusing servo apparatus comprising:
   (a) a focusing actuator for controlling a focusing state;
   (b) a sweep signal generating circuit for generating a pulse-shaped wave sweep signal which is supplied to said focusing actuator, the pulse-shaped wave sweep signal having a form such that during a predetermined time ta to a predetermined time tb the positive peaks of each pulse area constant value Pa and the negative peaks of each pulse gradually decrease from a zero value to the value Pa and during a predetermined time tb to a predetermined time tc the negative peaks of each pulse are a constant value Pb and the positive peaks of each pulse gradually decrease from the value Pa to the value Pb, where ta<tb<tc;
   (c) a loop switch for turning on and off a focusing servo loop; and
   (d) a controller for turning on and off said loop switch at a predetermined timing and controlling the sweep signal generating circuit.

2. A focusing servo apparatus according to claim 1, further comprising a processing circuit for generating a focusing error signal and a detecting circuit for monitoring said focusing error signal and detecting said predetermined timing.

3. A focusing servo apparatus according to claim 1 wherein said sweep signal generating circuit is a digital-to-analog converter.

4. A focusing servo apparatus according to claim 3, wherein said sweep signal generating circuit is composed of a pulse width modulation (PWM) signal generating circuit and a switch.

5. A focusing servo apparatus according to claim 1, wherein said controller is formed of a microcomputer.

6. A focussing servo apparatus according to claim 1 wherein the frequency of the sweep signal is between 300 Hz and 3KHz.

* * * * *